United States Patent [19]

Hirasa

[11] Patent Number: 5,073,944
[45] Date of Patent: Dec. 17, 1991

[54] AUDIO SYSTEM FOR AUTOMOTIVE VEHICLES

[75] Inventor: Yoshiaki Hirasa, Hiroshima, Japan

[73] Assignee: Mazda Motor Corporation, Hiroshima, Japan

[21] Appl. No.: 385,869

[22] Filed: Jul. 26, 1989

[30] Foreign Application Priority Data

Jul. 26, 1988 [JP] Japan .................. 63-186351

[51] Int. Cl.⁵ .............................................. H04B 1/00
[52] U.S. Cl. ..................... 381/86; 381/102; 381/109; 381/24
[58] Field of Search ............... 381/101, 102, 86, 98, 381/24, 109

[56] References Cited

U.S. PATENT DOCUMENTS

| | | | |
|---|---|---|---|
| 3,397,286 | 8/1968 | Prewitt et al. | 381/24 |
| 3,487,341 | 12/1969 | Grout | 381/102 |
| 3,702,901 | 11/1972 | Cherry | 381/109 |
| 4,164,625 | 8/1979 | Igeta | 381/86 |
| 4,514,599 | 4/1985 | Yanagishima et al. | 381/86 |
| 4,845,775 | 7/1989 | Kanagawa | 381/102 |

Primary Examiner—Forester W. Isen
Assistant Examiner—M. Nelson McGeary, III
Attorney, Agent, or Firm—Fish & Richardson

[57] ABSTRACT

An audio system for automotive vehicles with a plurality of speakers disposed inside the passenger compartment room of the automotive vehicle which includes a front speaker disposed at the front end of passenger compartment room and a rear speaker disposed at the rear end of passenger compartment room, front fader unit which is connected to the front speaker and is capable of transmitting mainly low frequency sounds by fading high frequency sounds, rear fader unit which is connected to the rear speaker and is capable of fading both high and low frequency sounds, and control unit for actuating said front fader unit and rear fader unit so as to control the balance of the front and rear speakers.

10 Claims, 4 Drawing Sheets

AUDIO SYSTEM FOR AUTOMOTIVE VEHICLES

FIELD OF THE INVENTION

This invention relates to an audio system for automotive vehicles, particularly to an audio system having multiple speakers such as the front and rear speakers in a passenger compartment room of the automotive vehicle.

BACKGROUND OF THE INVENTION

It is generally known to the public that recent audio systems enable passengers to control the balance of volume between the front and rear speakers, which are located in the front and rear ends of the passenger compartment room of the automotive vehicle, respectively. Such systems are shown, for example, in Japanese Laid-open Patent Application No. 61-12310.

Usually, such an audio system can be controlled to lower the volume of the rear speakers when a person who does not want to listen to loud sounds, like a sleeping baby, is in the rear seat. On the other hand, the audio system can be controlled to lower the volume of front speaker when the person in a front seat likes to listen to stereophonic sound.

These controls are calibrated to attenuate equally all the bands from low frequency to high frequency. However, when the front speakers are turned off, passengers in the front seat experience difficulties hearing low frequency sounds. This difficulty is caused by the nature of low frequency sound, which is inherently more difficult to perceive than high frequency sound. Therefore, when the front speakers are turned off it is more difficult to discriminate the low frequency sounds.

SUMMARY OF THE INVENTION

This invention provides an audio system for automotive vehicles which eliminates the difficulty in hearing low frequency sounds when the volume of the front speakers is low.

This purpose is accomplished by providing an audio system for automotive vehicles including a front speaker unit placed at the front end of passenger compartment with a front fader device for fading high frequency sounds, a rear speaker unit disposed at the rear end of the passenger compartment room with a rear fader device for fading all frequency sounds and a control device for controlling the volume balance between front and rear speaker units.

In accordance with this invention, the front speaker unit can be controlled to decrease only the high frequency sounds, so that a person who is in the front seat can sufficiently hear the low frequency sounds even if the volume of the front speaker is faded.

DETAILED DESCRIPTION OF THE INVENTION

First embodiment o the invention

Figure 1:
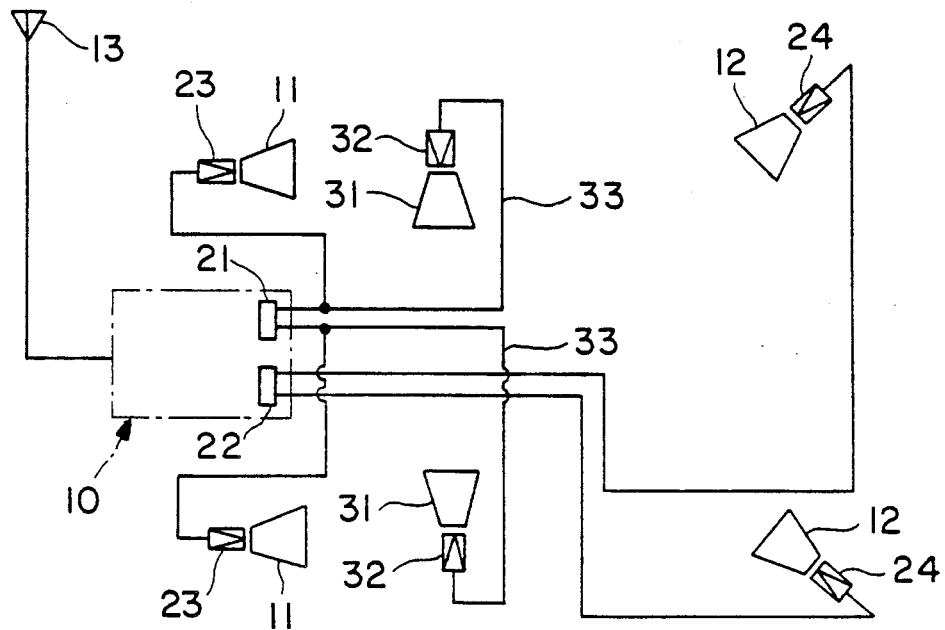
FIG. 1 is a schematic showing a first embodiment of the audio system for automotive vehicles in accordance with this invention.
Figure 3:
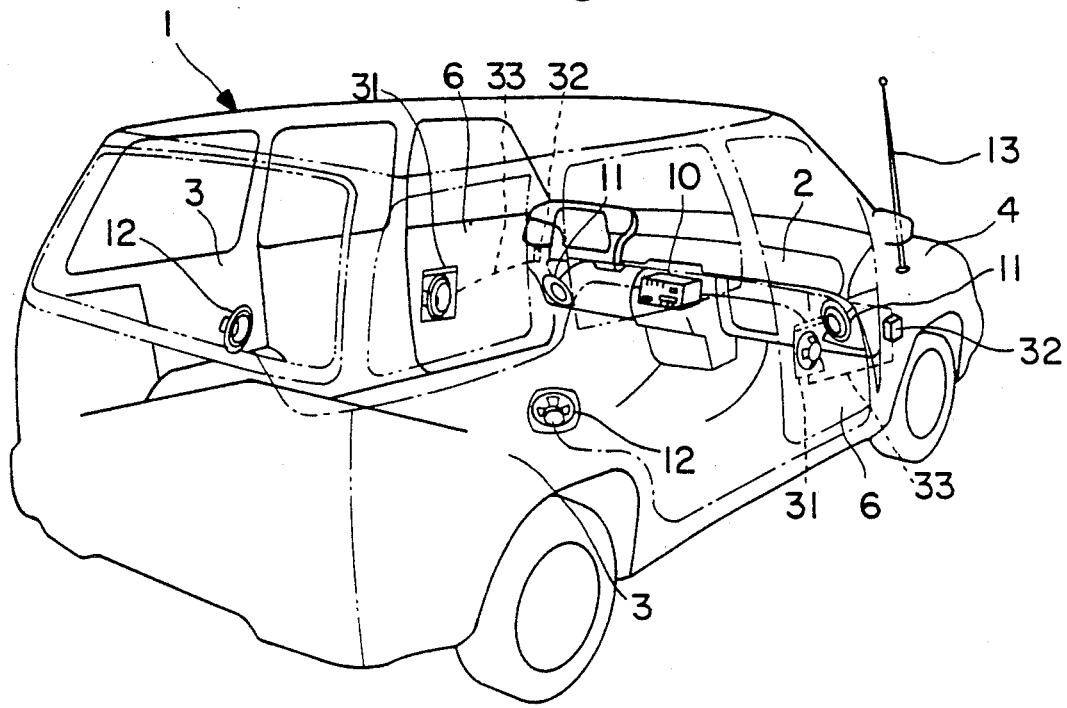
FIG. 3 is a perspective view showing the audio system located in the, passenger compartment room of the automotive vehicle.

In FIG. 1, an automotive vehicle 1 has a front end portion including an instrument panel 2 with center console in which is disposed an audio component 10 and on opposite sides is disposed a pair of opposite side panels 3 with a pair of area speakers 12 and an outside portion including a front fender 4 with a pole antenna 13 for receiving radio signals, as shown in FIG. 3.

Figure 2:
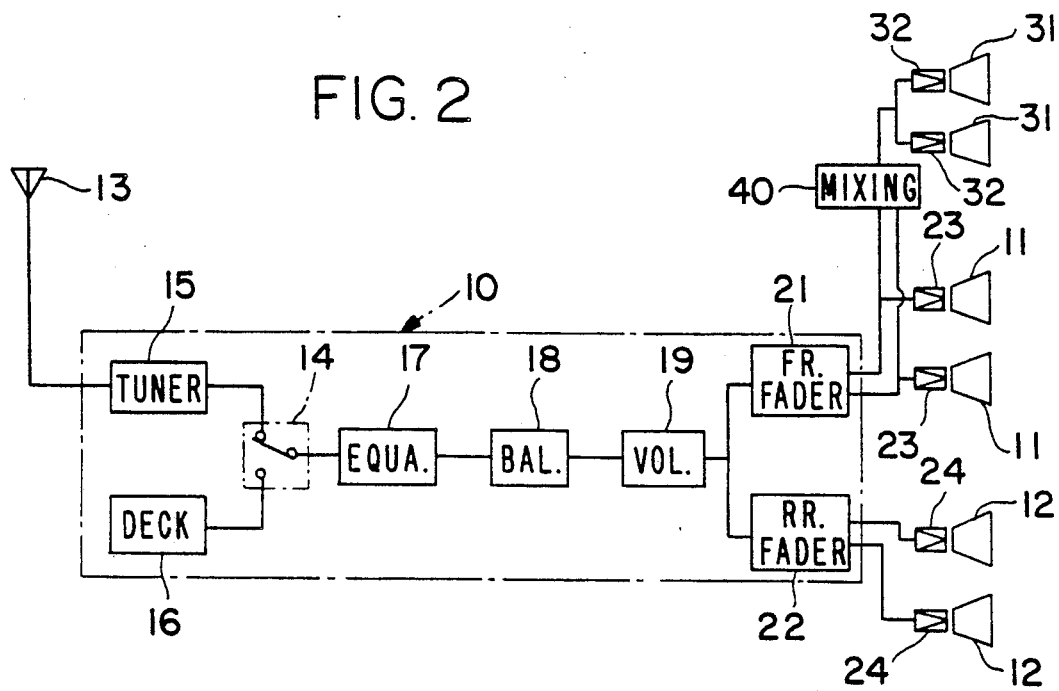
FIG. 2 is a block diagram of the first embodiment of the audio system for automotive vehicles in accordance with this invention.

As depicted in FIG. 2, the audio component 10 includes a tuner 15 which receives radio signals from the pole antenna 13, a player (or tape deck) 16 which plays back cassette tapes or compact discs, a select switch 14 which connects one of the outputs from the tuner 15 or the player 16 to an equalizer 17 for modifying sounds signals, which may include a tone control device, a balance circuit 18 which receives outputs of the equalizer 17 and adjusts the loudness balance between left and right speakers, and a volume adjuster 19 which receives outputs of the balance circuit 18 and controls the sound volume.

The audio component 10 further includes a front fader circuit 21 and a rear fader circuit 22 which receives outputs from the volume adjuster 19 which operates so as to adjust the balance between front and rear speakers 12 and which receives outputs of the rear fader circuit 22.

The front fader circuit 21 consists of a high frequency fader circuit which fades only high frequency sounds and fades those high frequency sounds equally.

The present invention can be applied not only to four-speaker audio systems comprising two front speakers and two rear speakers, but also to six-speaker audio systems comprising two additional speakers located in the opposite front doors.

In this embodiment, as shown in FIG. 1, a door speaker unit is provided which includes door speakers 31 placed in the front doors 6 and power amplifiers 32 for transmitting the amplified sound signals to the door speakers 31 which are located on opposite sides of the instrument panel 2, as illustrated in FIG. 3.

The door speakers 31 are woofer speakers which produce extremely low frequency sounds; the front speakers cannot usually create these Low frequency sounds because of their small size. Normally, front speakers are restricted to small sizes so that they may be installed in the limited space of the instrument panel 2. Thus, the front speakers ability to create extremely low frequency sound is limited. However, this embodiment provides a better acoustic effect by utilizing door speakers which can use the large inside spaces of the door to compensate for the limited ability of front speakers.

In addition, this embodiment makes the wire harness layout easier than conventional audio systems. In fact conventional audio systems need to connect the power amplifiers of the door speakers to both the front fader circuit and the rear fader circuit, because, when the front or rear speaker unit is faded, low frequency sounds from the other unit must be channeled to the door speaker to create an excellent acoustic effect.

On the other hand, this embodiment enables front speakers to output low frequency sounds even if the front speakers are faded by the passenger's manipulation. Accordingly, it is not necessary to input low frequency sounds from the rear speaker when the front speakers are faded. Therefore, harness wires connecting the power amplifiers of the door speaker units to the rear speaker units can be omitted, and the wiring work in an assembly line for automotive vehicles is greatly simplified.

Figure 4A:
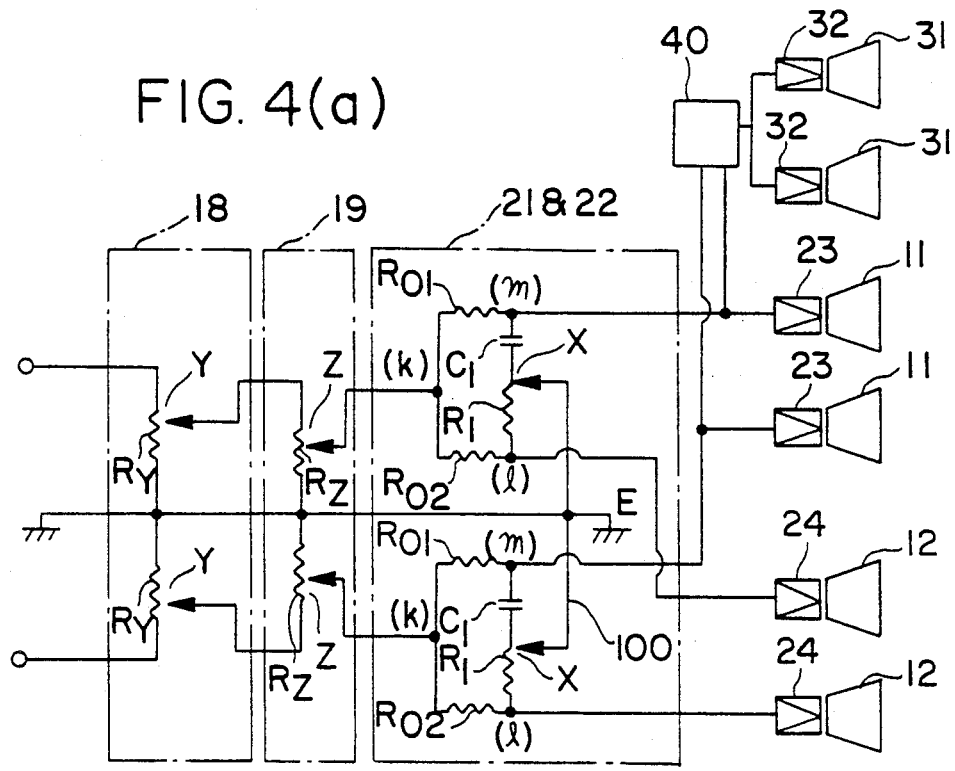
FIGS. 4(a) and 4(b) are partially detailed circuit diagrams showing an audio component of the first embodiment of the audio system for automotive vehicles in accordance with the present invention.
Figure 4B:
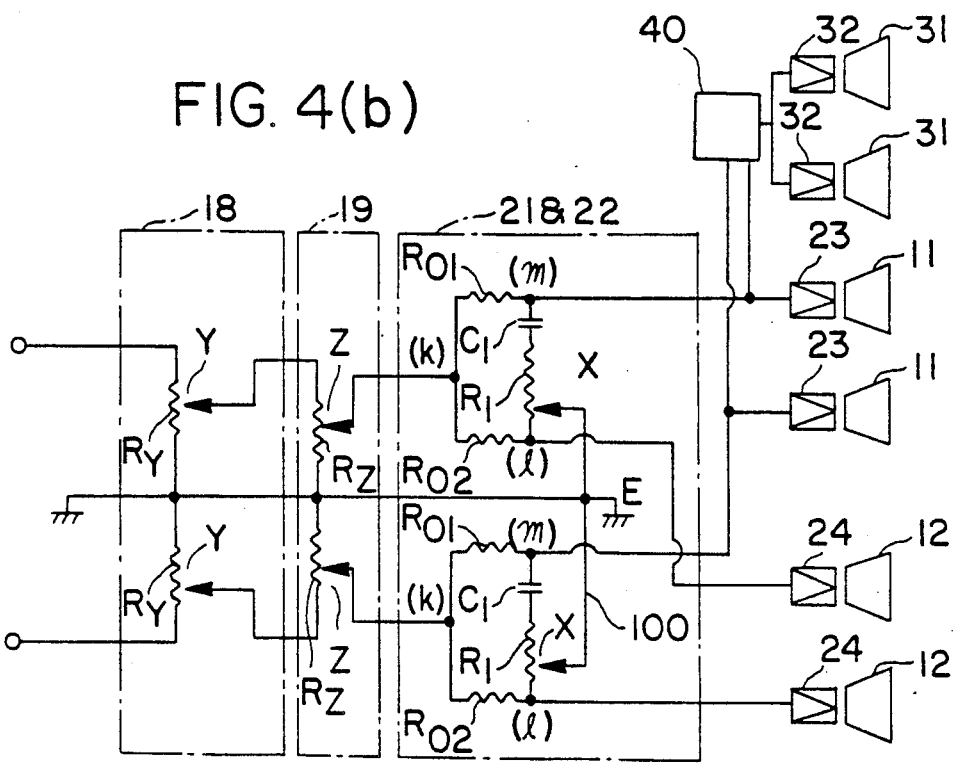

FIG. 4(a) and FIG. 4(b) show a partially detailed electric circuit of the audio component 10. The balance circuit 18 and the volume adjuster 19 are controlled manually by moving or sliding control contacts Y and Z, respectively. A pair of contacts Y move or slide in parallel in FIG. 4(a) or 4(b) so that the balance of right speakers and left speakers can be changed. A pair of contacts Z move or slide symmetrically in FIG. 4(a) or FIG. 4(b) so that all sounds change their volume at the same time.

The front fader circuit 21 and the rear fader circuit 22 are integrated in a common circuit, which has a pair of capacitors Cl, a pair of resistances Rl and a pair of contacts X of the fader controller 100. These contacts X move or slide in parallel in FIG. 4(a) or FIG. 4(b). The other end of the fader controller 100 is connected to the earth E.

FIG. 4(a) shows the condition of the front speaker 11 when it has been faded. The contacts X are connected with the ends of resistances Rl closest to the capacitor Cl in FIG. 4(a).

In this case, an electrical passage to ground E; i.e., the route through points (k), $R_{o1}$, (m), Cl, X and E, has a Low impedance to high frequency sound signals. Therefore, high frequency sound signals are transmitted to the rear speaker 12 through points (k) $R_{o2}$, and (1) without being faded.

On the other hand, any electrical passage to the earth E has high impedance for low frequency sound signals. Therefore, low frequency sound signals are transmitted to the front speakers 11, the door speakers 31, and the rear speakers 12 without being faded.

Next, FIG. 4(b) shows the condition of the rear speaker 12 being controlled to be faded. The contacts X are connected with the ends of the resistances Rl remote from the capacitor Cl in the FIG. 4(b).

In this case, an electrical passage to the earth E, i.e., the route through points (k), $R_{01}$, (m), Cl, Rl, X and E, has a high impedance for both high and low frequency sound signals. Therefore, sound signals are transmitted to the front speaker 11 or the door speakers 31 through points (k), $R_{01}$, and (m) without being faded. On the other hand, the other electrical signals pass to the earth E, i.e., the route through points (k), $R_{02}$, (1), X and E, establishes a short circuit. Therefore, all sound signals bypass the rear speakers 12 by being transmitted to the earth E.

Numeral 40 denotes a mixing unit, which merges sounds of left and right front speakers 11. Normally, low frequency sounds are apt to fluctuate between left and right speakers. Since the door speakers are of the extremely low frequency type, usage of the mixing unit 40 is effective to stabilize their outputs.

Figure 5:
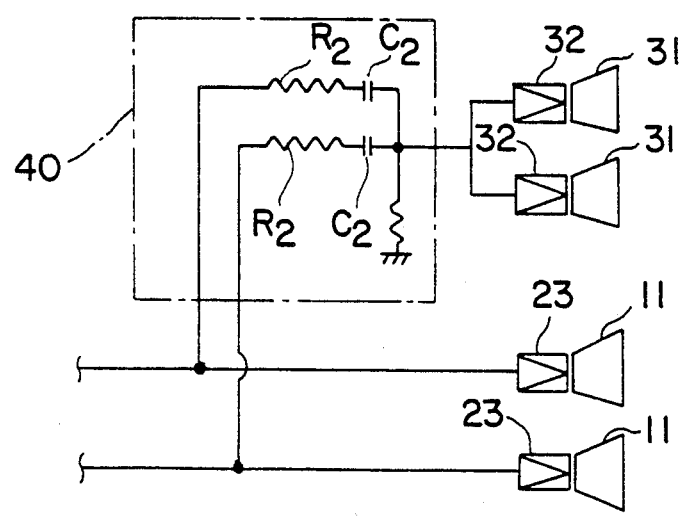
FIG. 5 is a detailed circuit diagram showing a mixing unit of the first embodiment; and, FIGS. 6, 7(a) and 7(b) are partially detailed circuit diagrams showing an audio component of the second embodiment of the audio system for automotive vehicles in accordance with this invention.

As illustrated in FIG. 5, the mixing unit 40 has a pair of resistances R2 and a pair of capacitors C2. The resistances R2 have high resistance values to establish high impedance. The capacitors C2 act to cut the DC component.

In this embodiment the circuit elements of FIG. 4(a) may have the following values:

| | |
|---|---|
| $R_1$ | 20kΩ |
| $R_Y$ | 20kΩ |
| $R_z$ | 50kΩ |
| $R_{o1}$ | 6.7kΩ |
| $R_{o2}$ | 4.7kΩ |
| $C_1$ | 4.7 μF |

In the embodiment shown in FIG. 5, the circuit elements may further have the following values:

| | |
|---|---|
| $R_2$ | 4.7kΩ |
| $C_2$ | 2 μF |

Choosing $R_{01}$ larger than $R_{02}$ will make the the rear speakers louder so the driver can hear them as well as the front speakers. The ratio of $R_{01}$ to $R_{02}$ is determined by experimentation depending on the specific vehicle type.

Second embodiment of the present invention

The second embodiment has a different balance circuit 180, and no mixing unit 40. Except for the balance circuit 180 and the mixing unit 40, the second embodiment has the same structure as the first embodiment. To prevent a double explanation, these common structures are omitted in the description of the second embodiment.

Figure 6:
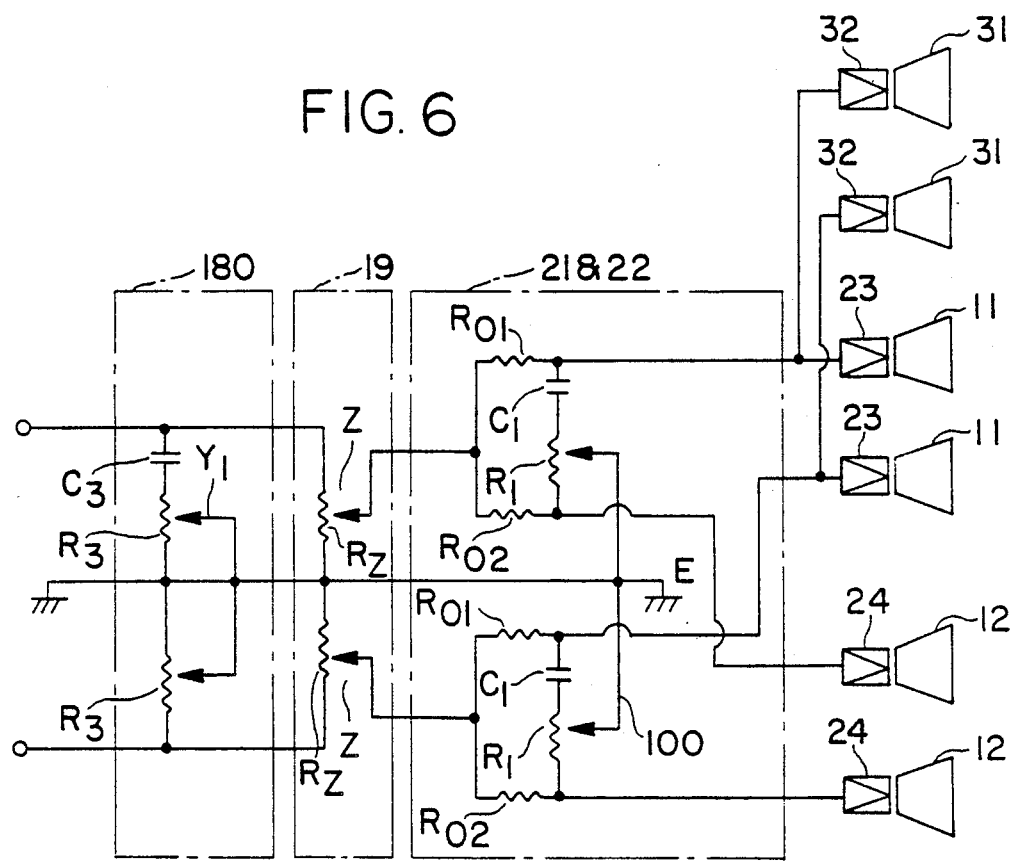
Figure 7A:
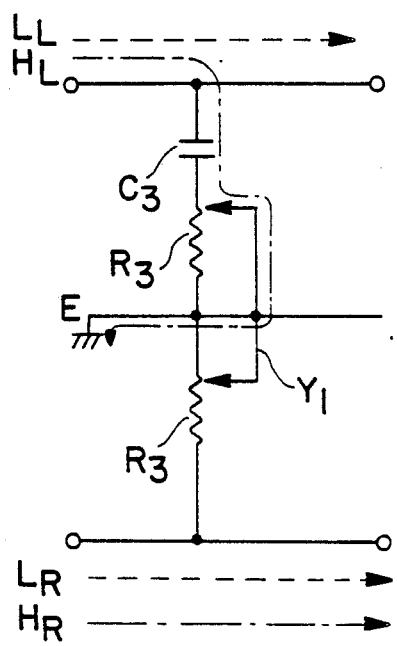
Figure 7B:
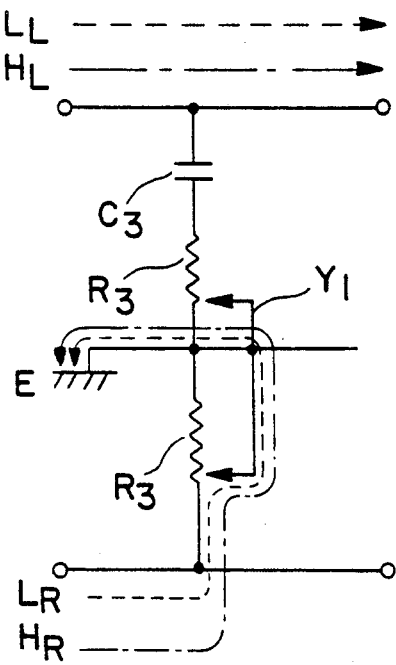

Referring to FIGS. 6, 7(a) and 7(b), the second embodiment is described in detail. The balance circuit lSO has a pair of resistances R3, a capacitor C3 and a contact Y1.

For convenience of explanation, suppose that the driver's seat is disposed at the left side (the upper side of FIGS. 6, 7(a) and 7(b). FIG. 7 (a) shows a condition in which the left speakers are faded. Then, FIG. 7 (b) shows a condition in which the right speakers are faded. Broken lines $L_L$ and $L_R$ illustrate routes by which the low frequency sound signals of the left and right speakers are transmitted, respectively. Also, chain lines $H_L$ and $H_R$ illustrate routes by which the high frequency sound signals of the left and right speakers are transmitted, respectively.

When the contacts Y1 are moved or slid manually toward the capacitor C3 to fade the left speakers, high frequency sound signals $H_L$ are transmitted to the earth E through capacitor C3. But, low frequency sound signals $L_L$ are transmitted to the left speakers (See FIG. 7(a)). Accordingly, drivers can listen to low frequency sounds better when they reduce the volume of the nearest speakers; i.e. the left speakers. Thus, a similar effect is obtained as in the first embodiment.

When the contacts Y1 are moved or slid manually opposite to the condenser C3 to fade the right speakers, both high and low frequency sound signals $H_R$ and $L_R$ are transmitted to the earth E through a short circuit (See FIG. 7(b)). As a result, all sounds of the right speakers are completely faded.

In this embodiment the circuit elements of FIG. 6 may have the following values:

| | |
|---|---|
| $R_1$ | 20kΩ |
| $R_3$ | 20kΩ |
| $R_2$ | 50kΩ |
| $R_{o1}$ | 6.7kΩ |
| $R_{o2}$ | 4.7kΩ |
| $C_1, C_3$ | 4.7 μF |

What is claimed is:

1. An audio system for an automotive vehicle with a plurality of speakers disposed inside a passenger compartment room of aid automotive vehicle, comprising:
    at least one front speaker disposed at a front end of said passenger compartment room and at least one rear speaker disposed at a rear end of said passenger compartment room;
    front fader means connected to said at least one front speaker for transmitting mainly low frequency sound signals and for fading high frequency sound signals;
    rear fader means connected to said at lest one rear speaker for fading both high and low frequency sound signals; and
    control means for actuating said front fader means and said rear fader means so as to control a balance between said at least one front speaker and said at least one rear speaker;
    wherein said front fader means does into fade low frequency sounds even when the high frequency sounds are faded to zero.

2. An audio system for automotive vehicles as in claim 1, further comprising at least one door speaker disposed in at least one side door, said at least on door speaker is connected to said front fader means so as to be faded by said front fader means.

3. An audio system for automotive vehicles as in claim 2, wherein said at least one side door is at least one front side door located in a front half of said passenger compartment room.

4. An audio system for automotive vehicles as in claim 2, wherein said at least one aside door speaker is of an extremely low frequency type.

5. An audio system for automotive vehicles as in claim 1, wherein said at least one front speaker is disposed in an instrument panel disposed at said front end of said passenger compartment room.

6. An audio system for automotive vehicles with a plurality of speakers disposed inside a passenger compartment room of said automotive vehicle, comprising:
    at least one driver's side speaker disposed in a half of said passenger compartment room in which a driver sits and at least one passenger's side speaker disposed in the other half of said passenger compartment room;
    a fader means which is connected to aid at least one driver's side speaker and is capable of transmitting mainly low frequency sound signals and fading high frequency signals;
    another fader means which is connected to said at least one passenger's side speaker and is capable of fading both high and low frequency sound signals; and
    a control means for actuating said fader means and said another fader means so as to control a balance between said at least one driver's side speaker and said at least one passenger's side speaker.

7. An audio system for an automotive vehicle with a plurality of speakers disposed inside a passenger compartment room of said automotive vehicle, comprising:
    at least one pair of left and right front speakers disposed at a front end of said passenger compartment room, at least one rear speaker disposed at a rear end of said passenger compartment room, and at least one door speaker disposed in a front door of said passenger compartment room;
    front faster means connected to said at least one pair of left and right front speakers for transmitting mainly low frequency sound signals and for fading high frequency sound signals;
    rear fader means connected to said at least one rear speaker of fading both high and low frequency sound signals;
    control means or actuating said front fader means and said rear fader means o as to control a balance between said at least one pair of left and right front speakers and said at lest one rear speaker, wherein said front fear means does not fade low frequency sounds even when the high frequency sounds are faded to zero; and
    mixer mean for receiving and merging sound from said at least one pair of left and right front speakers and delivering the merged sound to said at least one door speaker for providing a stabilized output from said at least one door speaker.

8. An audio system for automotive vehicles as claimed in claim 7, wherein each of said at least one door speaker comprises power amplifier means for transmitting amplified merged sound signals from said mixer means to said at least one door speaker.

9. An audio system for automotive vehicles as claimed in claim 8, wherein each of said of said at least one door speaker is a woofer speaker.

10. An audio system for automotive vehicles as claimed in claim 7, wherein said mixer means comprises (a) at least tow inputs comprising a first resistor-capacitor series circuit connected to an input of said left front speaker, and a second resistor-capacitor series circuit connected to an input of said right front speaker, (b) an output extending from a common terminal joining said first and said second resistor-capacitor series circuits, and (c) a resistance connected between said common terminal and ground.

* * * * *